United States Patent
Cyman, Jr. et al.

(10) Patent No.: US 8,184,304 B2
(45) Date of Patent: May 22, 2012

(54) SYSTEM AND METHOD OF OPERATING A RASTER IMAGE PROCESSOR

(75) Inventors: Theodore F. Cyman, Jr., Grand Island, NY (US); Paul A. Coniglio, East Amherst, NY (US); Kevin Patrick Kernin, Grand Island, NY (US); Carl F. Armstrong, Amherst, NY (US)

(73) Assignee: Moore Wallace North America, Inc., Chicago, IL (US)

( * ) Notice: Subject to any disclaimer, the term of this patent is extended or adjusted under 35 U.S.C. 154(b) by 1211 days.

(21) Appl. No.: 11/985,917

(22) Filed: Nov. 19, 2007

(65) Prior Publication Data

US 2009/0128841 A1    May 21, 2009

(51) Int. Cl.
*G06F 3/12* (2006.01)
*G06K 15/02* (2006.01)
*H04N 1/21* (2006.01)
*H04N 1/40* (2006.01)

(52) U.S. Cl. ......... 358/1.1; 358/1.4; 358/1.17; 358/1.18

(58) Field of Classification Search .............. 358/1.1, 358/1.3, 1.4, 1.8, 1.13, 1.16, 1.17, 1.18, 1.15, 358/502; 715/246, 247, 249
See application file for complete search history.

(56) References Cited

U.S. PATENT DOCUMENTS

| | | | |
|---|---|---|---|
| 4,025,925 A | 5/1977 | Jensen et al. | |
| 4,430,668 A | 2/1984 | Miles, Jr. | |
| 4,477,833 A | 10/1984 | Clark et al. | |
| 4,709,246 A | 11/1987 | Piatt et al. | |
| 4,709,247 A | 11/1987 | Piatt et al. | |
| 4,789,147 A | 12/1988 | Berger et al. | |
| 5,634,091 A | 5/1997 | Sands et al. | |
| 5,652,711 A * | 7/1997 | Vennekens | 358/1.17 |
| 5,706,410 A | 1/1998 | Bagley et al. | |
| 5,793,397 A | 8/1998 | Barker et al. | |
| 5,796,411 A | 8/1998 | Cyman et al. | |
| 5,949,438 A | 9/1999 | Cyman et al. | |

(Continued)

FOREIGN PATENT DOCUMENTS

CA        2 287 011        3/2001

(Continued)

OTHER PUBLICATIONS

International Search Report and Written Opinion in PCT/US2008/011562 dated Dec. 23, 2008.

(Continued)

*Primary Examiner* — Scott A Rogers
(74) *Attorney, Agent, or Firm* — McCracken & Frank LLC (57) ABSTRACT

A system for printing a page designated by a page description language representation has a first print unit for printing a color on a first portion of the substrate and a second print unit for printing the color on a second portion of the substrate. A first RIP determines and rasterizes the first portion of the page description language representation to generate a first raster image representation that is used by the first print unit to print a first portion of the page on the first portion of the substrate. A second RIP determines and rasterizes the second portion of the page description language representation to generate a second raster image representation that is used by the second print unit to print a second portion of the page on the second portion of the substrate.

20 Claims, 8 Drawing Sheets

U.S. PATENT DOCUMENTS

| | | | |
|---|---|---|---|
| 5,960,164 A | 9/1999 | Dorfman et al. | |
| 5,995,721 A | 11/1999 | Rourke et al. | |
| 6,003,988 A | 12/1999 | McCann et al. | |
| 6,019,454 A | 2/2000 | Serra et al. | |
| 6,049,390 A * | 4/2000 | Notredame et al. | 358/1.15 |
| 6,088,702 A | 7/2000 | Plantz et al. | |
| 6,088,710 A | 7/2000 | Dreyer et al. | |
| 6,134,018 A | 10/2000 | Dziesietnik et al. | |
| 6,224,192 B1 | 5/2001 | Robinson et al. | |
| 6,227,661 B1 | 5/2001 | Hayakawa | |
| 6,243,172 B1 | 6/2001 | Gauthier et al. | |
| 6,256,104 B1 | 7/2001 | Rumph et al. | |
| 6,275,303 B1 | 8/2001 | Fukaya | |
| 6,309,046 B1 | 10/2001 | Izawa et al. | |
| 6,327,599 B1 | 12/2001 | Warmus et al. | |
| 6,332,149 B1 | 12/2001 | Warmus et al. | |
| 6,353,483 B1 | 3/2002 | Laverty et al. | |
| 6,357,847 B1 | 3/2002 | Ellson et al. | |
| 6,375,296 B1 | 4/2002 | McGarry et al. | |
| 6,381,028 B1 | 4/2002 | Gauthier | |
| 6,396,593 B1 | 5/2002 | Laverty et al. | |
| 6,446,100 B1 | 9/2002 | Warmus et al. | |
| 6,540,315 B1 | 4/2003 | Nystrom et al. | |
| 6,563,601 B1 * | 5/2003 | Yamada et al. | 358/1.9 |
| 6,606,165 B1 | 8/2003 | Barry et al. | |
| 6,608,697 B1 | 8/2003 | Schorr et al. | |
| 6,633,890 B1 | 10/2003 | Laverty et al. | |
| 6,789,879 B2 | 9/2004 | Khalid | |
| 6,814,511 B2 | 11/2004 | Bhatti | |
| 6,826,534 B1 | 11/2004 | Gupta et al. | |
| 6,863,367 B2 * | 3/2005 | Hamamoto et al. | 347/23 |
| 6,891,630 B1 | 5/2005 | Miyasaka et al. | |
| 6,895,554 B2 | 5/2005 | Endress et al. | |
| 6,898,601 B2 | 5/2005 | Amado et al. | |
| 6,952,801 B2 | 10/2005 | Warmus et al. | |
| 6,980,964 B1 | 12/2005 | Cocotis et al. | |
| 6,981,214 B1 | 12/2005 | Miller et al. | |
| 7,088,462 B2 | 8/2006 | Bhogal et al. | |
| 7,168,784 B2 | 1/2007 | Donovan et al. | |
| 7,454,162 B2 | 11/2008 | Segerer et al. | |
| 7,505,157 B2 * | 3/2009 | Christodoulou et al. | 358/1.15 |
| 2001/0048533 A1 | 12/2001 | Koana | |
| 2002/0078012 A1 | 6/2002 | Ryan et al. | |
| 2002/0149792 A1 | 10/2002 | Gauthier et al. | |
| 2002/0152183 A1 | 10/2002 | Soares et al. | |
| 2002/0165760 A1 | 11/2002 | Delurgio et al. | |
| 2003/0002069 A1 | 1/2003 | Bhogal et al. | |
| 2003/0023636 A1 | 1/2003 | Lee et al. | |
| 2003/0154137 A1 | 8/2003 | Carroll et al. | |
| 2003/0231328 A1 | 12/2003 | Chapin et al. | |
| 2004/0008359 A1 | 1/2004 | Christiansen | |
| 2004/0049608 A1 * | 3/2004 | Sakurai | 710/5 |
| 2004/0196496 A1 | 10/2004 | Klassen | |
| 2004/0205462 A1 | 10/2004 | Levine | |
| 2005/0063010 A1 | 3/2005 | Giannetti | |
| 2005/0080750 A1 | 4/2005 | Carling et al. | |
| 2005/0111044 A1 | 5/2005 | Giannetti | |
| 2005/0111867 A1 | 5/2005 | Hatano | |
| 2005/0125726 A1 | 6/2005 | Harper et al. | |
| 2005/0216832 A1 | 9/2005 | Giannetti | |
| 2005/0289461 A1 | 12/2005 | Amado et al. | |
| 2006/0082814 A1 | 4/2006 | Gardner | |
| 2006/0092198 A1 | 5/2006 | Conca et al. | |
| 2006/0103689 A1 | 5/2006 | Vinas et al. | |
| 2006/0107194 A1 | 5/2006 | Gale | |
| 2006/0136307 A1 | 6/2006 | Hays et al. | |
| 2006/0156232 A1 | 7/2006 | Giannetti et al. | |
| 2006/0164679 A1 | 7/2006 | Kim et al. | |
| 2006/0248454 A1 | 11/2006 | Giannetti | |
| 2007/0070376 A1 * | 3/2007 | Owen et al. | 358/1.13 |
| 2008/0037047 A1 | 2/2008 | Condon et al. | |
| 2008/0151287 A1 * | 6/2008 | Birkenfeld et al. | 358/1.15 |
| 2008/0278740 A1 | 11/2008 | Bird et al. | |
| 2009/0033986 A1 | 2/2009 | Himpe | |
| 2010/0110467 A1 * | 5/2010 | Coniglio et al. | 358/1.13 |

FOREIGN PATENT DOCUMENTS

| | | |
|---|---|---|
| EP | 917 042 | 5/1999 |
| EP | 1 033 645 | 9/2000 |
| EP | 1 498 839 | 1/2005 |
| EP | 1 724 673 | 11/2006 |
| EP | 1 975 772 | 10/2008 |
| GB | 2 387 817 | 10/2003 |
| JP | 2007156903 A * | 6/2007 |

OTHER PUBLICATIONS

International Search Report and Written Opinion in PCT/US2008/013837 dated Mar. 19, 2009.

International Search Report and Written Opinion, International Application No. PCT/US008/04099 dated Jun. 11, 2008.

Search Report in European Application No. 08 00 5957 dated Dec. 22, 2008.

Int'l Preliminary Report on Patentability for Application No. PCT/US2008/13 837 dated Jun. 22, 2010.

Reply to Written Opinion prepared by the EPO, dated Sep. 1, 2010 for Application No. EP2225709.

Int'l Preliminary Report on Patentability for Application No. PCT/US2007/03241 dated Sep. 29, 2009.

Int'l Preliminary Report on Patentability for Application No. PCT/US2008/11562 dated May 25, 2010.

Amended claims after receipt of European search report, and letter from Mr. Marshall (Serjeants) to the EPO dated Aug. 4, 2010, re: amended claims for Application No. EP2223266.

Communication from the EPO Examining Division dated Mar. 24, 2011 and annex to the communication, re: examination response to amended claims for Application No. EP2223266.

* cited by examiner

SYSTEM AND METHOD OF OPERATING A RASTER IMAGE PROCESSOR

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to printing systems and more particularly to a system that generates data to be printed by a plurality of printing cartridges.

2. Description of the Background of the Invention

Composition programs such as QuarkXpress™ and Adobe InDesign™ enable a document designer to specify the content that is to appear on one or more pages of a document. Thereafter, the composition program generates a representation of the pages of the document in accordance with a page description language (PDL) such as PostScript or Portable Document Format (PDF) developed by Adobe Systems, Inc., or Printer Command Language (PCL) developed by Hewlett Packard, Inc. A raster image processor (RIP) generates a raster image representation of each page of the document from the PDL representation. The raster image representation may be used by a platemaker to create plates that are used on lithographic presses, an engraver to create engraved cylinders for a gravure press, or by a controller to drive the print units in a digital press. The raster image representation may be bitmap representation (one bit per pixel), a grayscale representation, or a color representation.

If a document incorporates variable data then the designer uses the composition program to create a template that specifies content of the fixed portion of the document (i.e., those portions that are not variable) and information regarding the position and content of the variable data areas. The designer may use a composition program that is specialized for creating the template. Alternately, the designer may use a composition program like InDesign or QuarkXPress with a plug-in or an XTension (a type of plug-in that works with by QuarkXPress) that allows the specification of information regarding variable data areas of a document. An example of a composition system that may be used to create templates is described in Warmus et al., U.S. Pat. No. 6,327,599, that is incorporated herein by reference. A data system combines information from a database with the template to generate PDL representations of the pages that represent the renditions of the variable data documents. The PDL representations may be in PostScript or PDF as described above or in formats (languages) designed to facilitate representation of renditions of variable data documents such as PPML, PPML/VDX, VPS, etc. The PDL representation may also be in page description languages based on PostScript or PDF that extend such formats through additional operators or libraries.

A RIP uses the PDL representation of the pages generated by the data system to create raster image representations of the pages for printing on a digital press. Such raster image representations are sent to one or more controllers in the press. The press controllers use the raster image representations to control printing by the press. The digital press may use any of number of printing technologies including electrophotography, ion deposition, magnetography, or ink jet.

Some printing systems use a printing unit that is capable of printing an raster image representation that is the width of a substrate supported by the printing system. However, the cost and complexity of such printing units increases as the width of the raster image representation printed thereby. To overcome this problem, printing systems have been developed where a first and a second printing unit are arranged such that the first printing unit prints a first swath of a first raster image representation and the second printing unit prints a second swath of a second raster image representation, wherein the first swath is printed adjacent to the second swath. In this fashion, a printing system have use two printing units, wherein each printing unit is able to print a 12 inch wide swath of a raster image representation, to print on a substrate that is 24 inches wide. Similarly, a printing system may use more than two printing units arranged in this manner to print on even wider substrates.

A RIP is associated with each printing unit of the printing system in which multiple print units are arranged to achieve a print width wider than the print width of an individual printing unit. Each RIP generates a raster image representation that is as wide as the printing unit associated therewith. Furthermore, typical RIPS operate on page boundaries. If a page is to be printed on the region of the substrate where a swath printed by a first printing unit abuts a swath printed by the second printing unit, the page must be composed using the composition system as two sub-pages. In particular, a first sub-page is composed that contains the information to be printed by the first printing unit and a second sub-page is composed that contains information to be printed by the second printing unit. Separate PDL representations are created for each of the first and second sub-pages, which are sent to the RIPs associated with first printing unit and the second printing unit, respectively. If a content element (e.g., an image or a text box) spans the boundary between the first sub-page and the second sub-page, the content element must be split into two sub-elements, wherein the first sub-element is part of the first sub-page and the second sub-element is part of the second sub-page. The splitting of the page and, possibly, the components thereof requires operator skill or additional features in composition tools. In addition, once a page is split into two sub-pages, the resulting sub-pages are bound to a particular type of printing system that is defines dimensions of the sub-pages. If the page is split in accordance with the characteristics of a first printing system and then needs to be printed on a second printing system (e.g., one with printing units that have a different print width), the page may have to be split again into sub-pages in accordance with the second printing system. For these reasons, it is difficult to use existing composition systems and RIP's to a generate raster image representation of a page that spans multiple printing units of a printing press.

SUMMARY OF THE INVENTION

According to one aspect of the invention a system for printing a page on a substrate, wherein the page is designated by a page description language representation, includes a first print unit for printing a color on a first portion of the substrate, a second print unit for printing the color on a second portion of the substrate wherein the first and second portions of the substrate do not substantially overlap, and a first RIP that determines a first portion of the page description language representation to rasterize and rasterizes the first portion of the page description language representation to generate a first raster image representation, wherein the first raster image representation is used by the first print unit to print a first portion of the page on the first portion of the substrate. The system further includes a second RIP that determines a second portion of the page description language representation different than the first portion of the page description language representation and rasterizes the second portion of the page description language representation to generate a second raster image representation, wherein the second raster image representation is used by the second print unit to print a second portion of the page on the second portion of the substrate.

In another aspect of the present invention a method for printing a page on a substrate, wherein the page is designated by a page description language representation, comprises the steps of determining and rasterizing a first portion and a second portion of the page description language representation to generate a first and a second raster image representation, respectively, wherein the first and second portions are determined by first and second raster image processors, respectively, and the first and second raster image representations are generated by first and second raster image processors, respectively; controlling a first print unit to print a color in accordance with the first raster image representation to print thereby the first portion of the page on a first portion of the substrate, wherein the first portion of the page is less than the entirety thereof; controlling a second print unit to print the color in accordance with the second raster image representation to print thereby the second portion of the first page on a second portion of the substrate; and wherein the first portion of the page description language representation is different than the second portion of the page description language representation and the first and second portions of the substrate do not substantially overlap.

Other aspects and advantages of the present invention will become apparent upon consideration of the following detailed description.

DETAILED DESCRIPTION OF THE PREFERRED EMBODIMENTS

Figure 1:
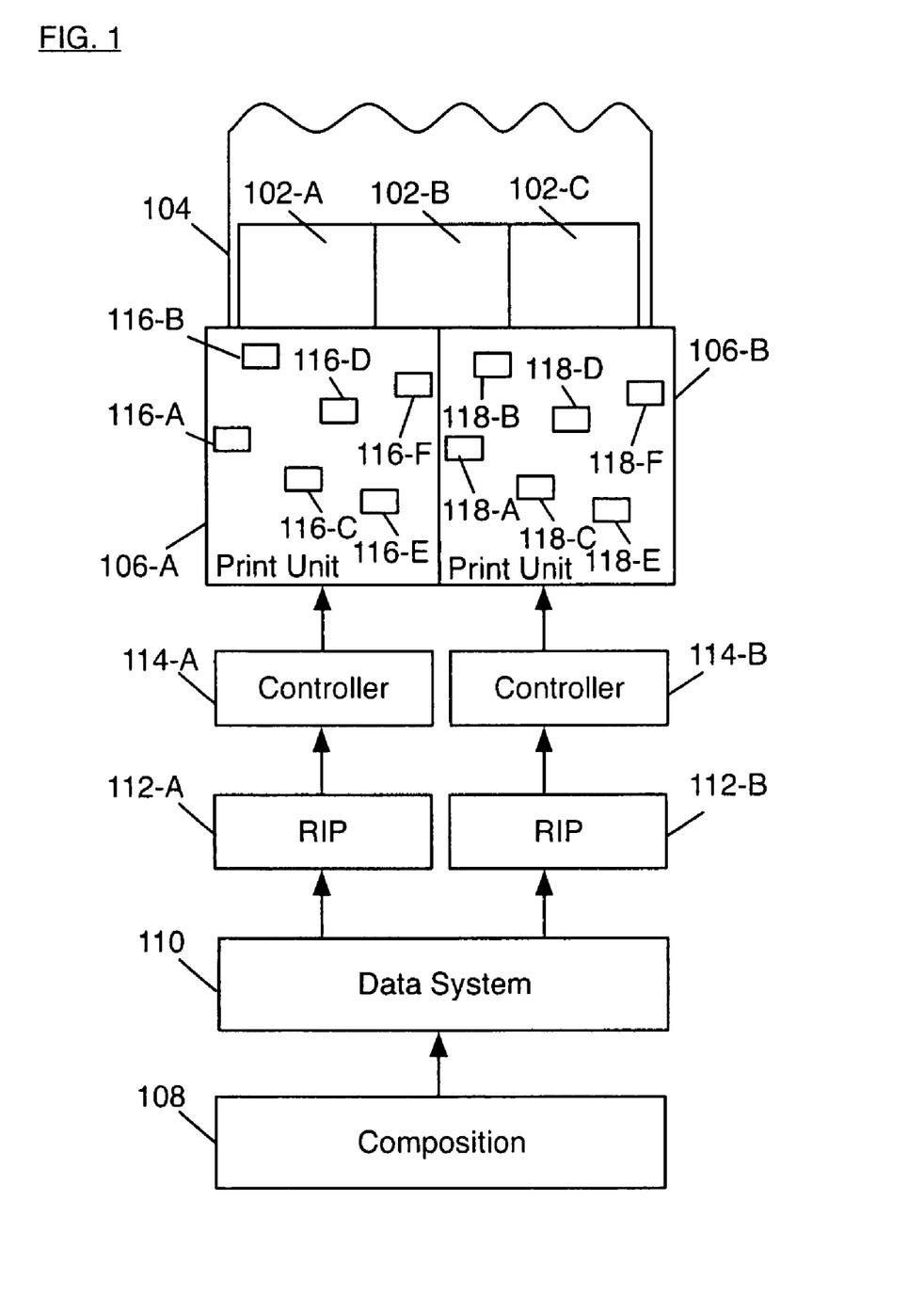
FIG. 1 shows an embodiment of a system for printing three pages using two print units.

FIG. 1 shows how a composition and printing system are used to print three pages of content 102-A, 102-B, and 102-C onto a substrate 104 using two print units 106-A and 106-B. In particular, a composition program 108 is used to define content and position of the elements that are to be printed on each of the pages 102-A, 102-B, and 102-C. The composition program 108 generates a PDL representation of each page. Optionally, a data system 110 processes each PDL representation generated by the composition system to incorporate variable data from a database or perform other post-composition processing using the PDL. Processing of the PDL by the data system 110 results in another PDL that in the same format (e.g., PostScript, PDF, PCL, etc) generated by the composition system 108 or in a different PDL format. In one embodiment, the composition system 108 produces first PDL representations of the three pages to be printed in a modified PDF format that uses PDF annotations to specify information regarding position and content of elements to be printed on each page. The data system 110 uses each of the PDL representations generated by the composition system to generate second PDL representations for the pages to be printed in a proprietary format similar to PostScript. The second PDL representation specifies the content of the pages to be printed in accordance with the PDF annotations in the first PDL representation. The data system 110 provides the PDL representations that specify the content of pages 102-A and 102-B to a first RIP 112-A that is associated with the print unit 106-A. In addition, the data system 110 provides the PDL representations of pages 102-B and 102-C to a RIP 112-B that is associated with the print unit 106-B.

The data system 110 may also be used to impose PDL representations of pages generated by the composition system. Imposing the PDL's involves selecting which pages are to be printed adjacent to one another or which pages are to be printed on opposite sides of a sheet (e.g., for duplexing). The data system 110 may also be used to convert the PDL representation of a page from a first format (e.g., PDF) produced by the composition system into a second format (e.g., PostScript) that may be consumed by the RIP.

As noted above, the data system 110 is optional and in some embodiments, the composition system 108 generates and provides PDL representations of pages 102-A and 102-B to the RIP 112-A and PDL representations of pages 102-B and 102-C to the RIP 112-B.

The RIP 112-A uses the PDL representation of the pages 102-A and 102-B, from either the data system 110 or the composition system 108, to generate raster image representations of these pages. In particular, the RIP 112-A generates a raster image representation of the page 102-A and a portion of the page 102-B that are to be printed using the print unit 106-A. These raster image representations are provided to a controller 114-A that controls the operation of the print unit 106-A. In one embodiment, the print unit 106-A uses a plurality of ink jet nozzles to transfer ink onto the paper 104 and the controller 114-A controls the firing of the individual ink jet nozzles that comprise the print unit 1060A. In another embodiment, the print unit 106-A may use electrophotography and the controller 114-A controls a charge source (e.g., laser, LED) to select where a charge is placed on an electrophotographic drum. It should be apparent that although the embodiments of printing system described herein refer to printing on paper, such printing system may be adapted for printing onto other types of substrates by one skilled in the art. Examples of other types of substrates include textiles, plastics, vinyl, foils, etc.

The RIP 112-B operates in a manner similar to the RIP 112-A described above, except that the RIP 112-B produces a raster image representation of a portion of the page 102-B and of the page 102-C, and such raster image representations are used by a controller 114-B to control the print unit 106-B.

In some embodiments the RIP 112-A generates a raster image representation of only those page elements of the page 102-B that are to be printed using print unit 106-A. In addition, if an element of the page 102-B straddles the boundary between the portions of the page 102-B to be printed by the print units 106-A and 106-B, the RIP 112-A produces a raster image representation of only that portion of the element that to be printed by the print unit 106-A. Similarly, the RIP 112-B produces a raster image representation of only that portion of the element that is to be printed by the print unit 106-B.

In another embodiment, the RIP 112-A produces a raster image representation of the entire element that straddles the boundary and includes such raster image representation into the raster image representation that is provided to the controller 114-A. The controller thereafter clips the raster image representation to in accordance with the portions of the page 102-A and 102-B that are to be printed by the print unit 106-A. Note that the RIP 112-A provides a raster image representation to the controller 114-A that contains the raster image representations of the page 102-A and the portion of the page 102-B that is to be printed by print unit 106-A.

In some embodiments, the print units 106-A and 106-B are comprised of ink jet printing cartridges. Referring once again to FIG. 1, the print unit 106-A comprises printing cartridges 116-A through 116-F and the image representation generated by the RIP 114-A is stitched among these printing cartridges 116-A through 116-F. Specifically, the image representation is divided into swaths, and each of the cartridges 116-A through 116-F prints one swath of the image. Printing of all of the swaths adjacent to one another results in a printed representation of the entire raster image representation produced by the RIP 114-A. Print units comprised of ink jet cartridges are described in jointly assigned U.S. patent application Ser. No. 11/701,802, filed on Feb. 2, 2007, and U.S. Provisional Application Ser. No. 60/765,353, filed on Feb. 3, 2006. Both of these applications are incorporated herein by reference in their entirety.

The controller 114-A coordinates the division of an image into swaths and the printing of each swath by one of the printing cartridges 116-A through 116-F. In particular, each line of the raster image representation created by the RIP 112-A is divided into segments and raster data corresponding to each segment is used to determine when a nozzle of the printing cartridge that is to print that segment ejects ink.

In some embodiments, the cartridges 116-A through 116-F that comprise the print unit 106-A are mounted on a carrier plate. The carrier plate has apertures cut therein that are, typically, precisely positioned. The apertures provide a means to affix the cartridges to the carrier plate in particular positions. The printing cartridges 116-A through 116-F may be affixed to the carrier directly, or a mount (or holder) may be affixed to the carrier semi-permanently and a printing cartridge may be inserted into the mount. Such mounts allow a cartridge to be easily inserted and removed (e.g., for maintenance), yet the mount provides sufficient support to the cartridge to prevent movement thereof during operation.

The print unit 106-B may be similar to the print unit 106-A and be comprised of printing cartridges 118-A through 118-F. In this case, the controller 114-B divides the raster image representation generated by the RIP 112-B into swaths for printing using the printing cartridges 118-A through 118-F in a manner identical to that described above with respect to the print unit 106-A. It is possible to use two print units 106-A and 106-B, where in the print unit 106-A is comprised of printing cartridges 116-A through 116-F but the print unit 106-B is a discrete printing unit (i.e., is not comprised of printing cartridges). It is even possible that the print units 106-A and 106-B use different printing technologies.

Figure 2:
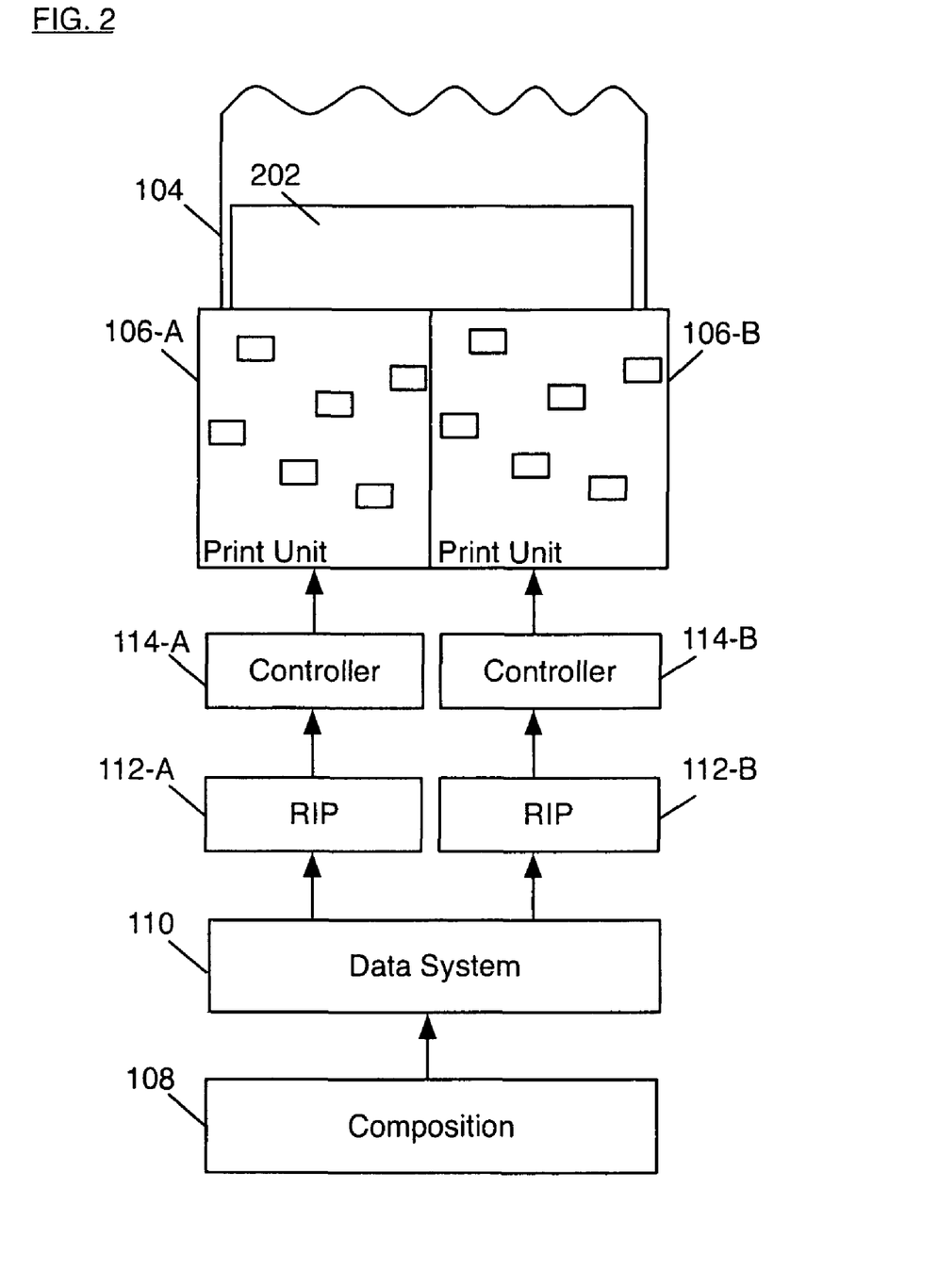
FIG. 2 shows an embodiment of a system for printing a page using two print units.

FIG. 2 illustrates printing of one page 202 using the print units 106-A and 106-B. Specifically, the composition system 108 is used to specify the content and position of the elements that are to be printed. The system 108 provides a PDL representation of the page 202 to the data system 110 or directly to the RIPs 112-A and 112-B as described above. If the data system 110 is used then the data system 110 generates another PDL representation of the page and provides such PDL representation to the RIPs 112-A and 112-B. The RIP 112-A generates a first image representation of the portion of the page 202 that is to be printed by the print unit 106-A and the RIP 112-B generates a second image representation of the portion of the page 202 that is to be printed by print unit 106-B. The controller 114-A uses the first image representation to control printing by the print unit 106-A and the controller 114-B uses the second image representation to control printing by the print unit 106-B.

Figure 3:
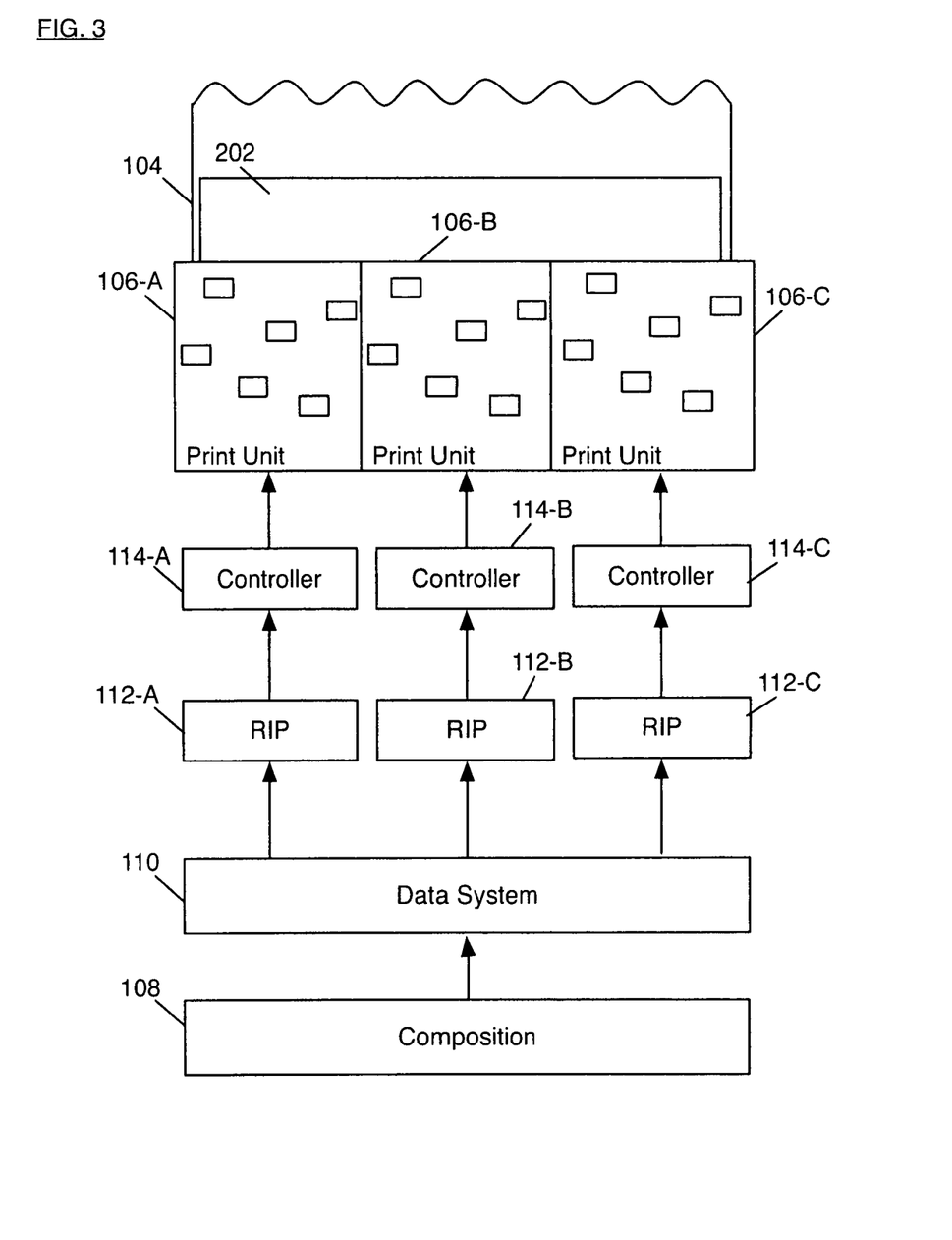
FIG. 3 shows an embodiment of a system for printing a page using three print units.

FIG. 3 shows how one page 202 may be printed on a substrate 104 using three print units 106-A, 106-B, and 106-C and wherein each such printing unit prints a portion of the page 202. In particular, the composition system 108 generates a PDL representation of the page 202 which may be used by the optional data system 110 to produce another PDL representation of the page. The PDL representation produced by the composition system 108 or, if it is being used, the data system 110 is provided to each of the RIP's 112-A, 112-B, and 112-C. The RIP 112-A generates a raster image representation of the portion of the page 202 that the print unit 106-A is to print. The controller 114-A uses such raster image representation to control the print unit 106-A to print the portion of the page 102 that is to be printed thereby. Similarly, the composition system 108 or the data system 110 generate a PDL representation of the page 102 that is used by the RIP's 112-B and 112-C to generate raster image representations of the portions of the page that are printed by the print units 106-B and 106-C, respectively. The controller 114-B uses the raster image representation generated by the RIP 112-B to control the print unit 106-B to print the portion of the page 102 thereby. The controller 114-C uses the raster image representation generated by the RIP 112-C and controls the print unit 106-C to print the portion of the page that is to be printed by such print unit.

Figure 4A:
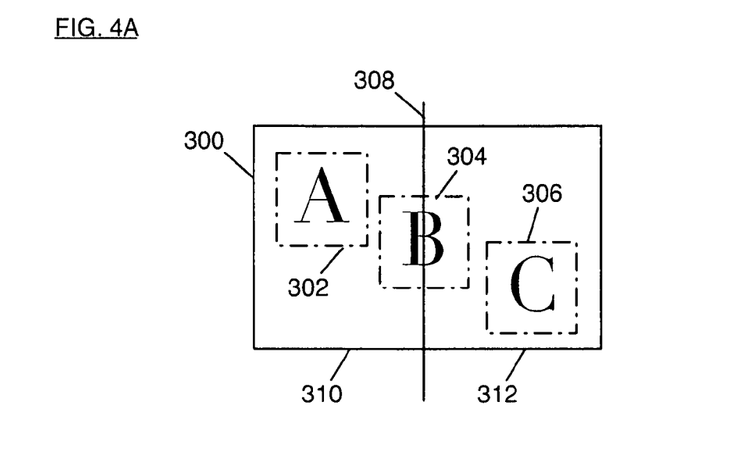
FIGS. 4A-4C illustrate how raster image representations of pages may be created by embodiments of the systems shown in FIGS. 1 and 2.

FIG. 4A illustrates a page 300 that an embodiment of the system shown in FIG. 2, which uses two print units, may produce. The page 300 comprises three elements 302, 304, and 306. These elements may be, for example, images or text boxes. The line 308 illustrates how the print units 106-A and 106-B print the page 300. That is, the print unit 106-A prints a first portion 310 of the page 300 and the print unit 106-B prints a second portion 312. The composition system 108 generates a PDL representation of the entire page 300. The RIPs 102-A and 102-B receive a PDL representation of the entire page 300 from either the composition system 108 or the data system 110 (as described above).

Figure 4B:
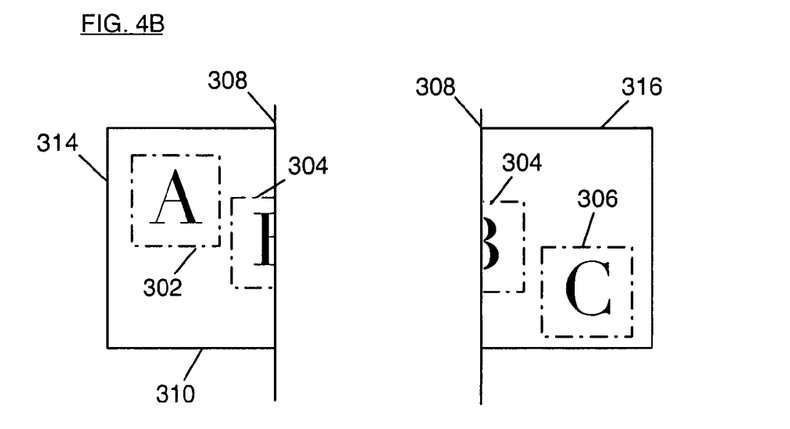

FIG. 4B shows a first image representation 314 that one embodiment of the RIP 112-A produces for the first portion 310 of the page 300 that is to be printed by the print unit 106-A. Note that only the portion of the element 304 that is to be printed by the print unit 106-A is included in the first image representation 314. FIG. 4B also shows a second image representation 316 that the RIP 112-B produces for the second portion 312 of the page 300 and that is to be printed by the print unit 106-B. Only the portion of the element 304 that is to be printed print unit 106-B is included in the raster image representation.

Figure 4C:
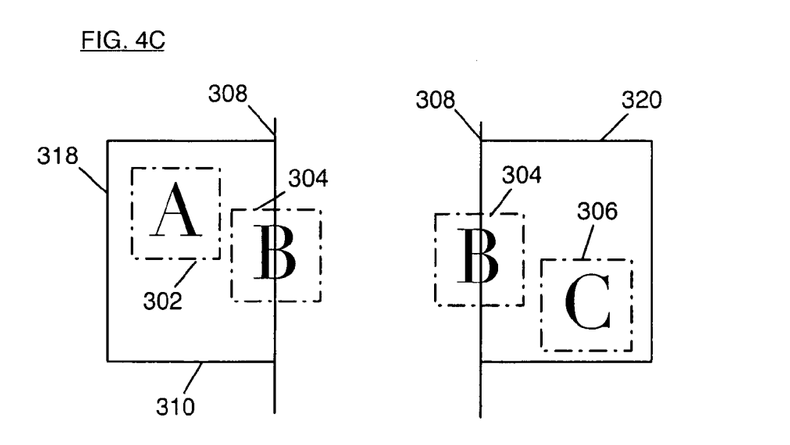

FIG. 4C shows a first image representation 318 that another embodiment of the RIP 112-A produces for the first portion 310 of the page 300. This embodiment includes the entire element 304 in the first image representation 318. The RIP 112-A provides to the controller 114-A information that the controller 114-A uses to select the region of the first raster image representation 318 to print using the print unit 106-A. Such information may be provided as coordinates of a rectangle that defines a boundary of the selected region. Alternately, the RIP may provide the controller 114-A with an offset into the raster image representation and the width of the raster image representation that is to be printed by the print unit 106-A. The controller 114-A uses the data in the selected region of the raster image representation 318 provided by the RIP 112-A to control printing by the print unit 106-A. The raster image representation 320 generated by the RIP 112-B is used in a similar fashion by the controller 114-B to control printing of the second portion 312 of the page 300 by the print unit 106-B. It should be apparent that the controller 114-A may use the raster image representation 314 and the controller 114-B may use the raster image representation 320 to cause print units 106-A and 106-B, respectively, to print the page 300. Similarly, the controller 114-A may use the raster image representation 318 and the controller 114-B may use the raster image representation 316 to cause print units 106-A and 106-B, respectively, to print the page 300.

Figure 5:
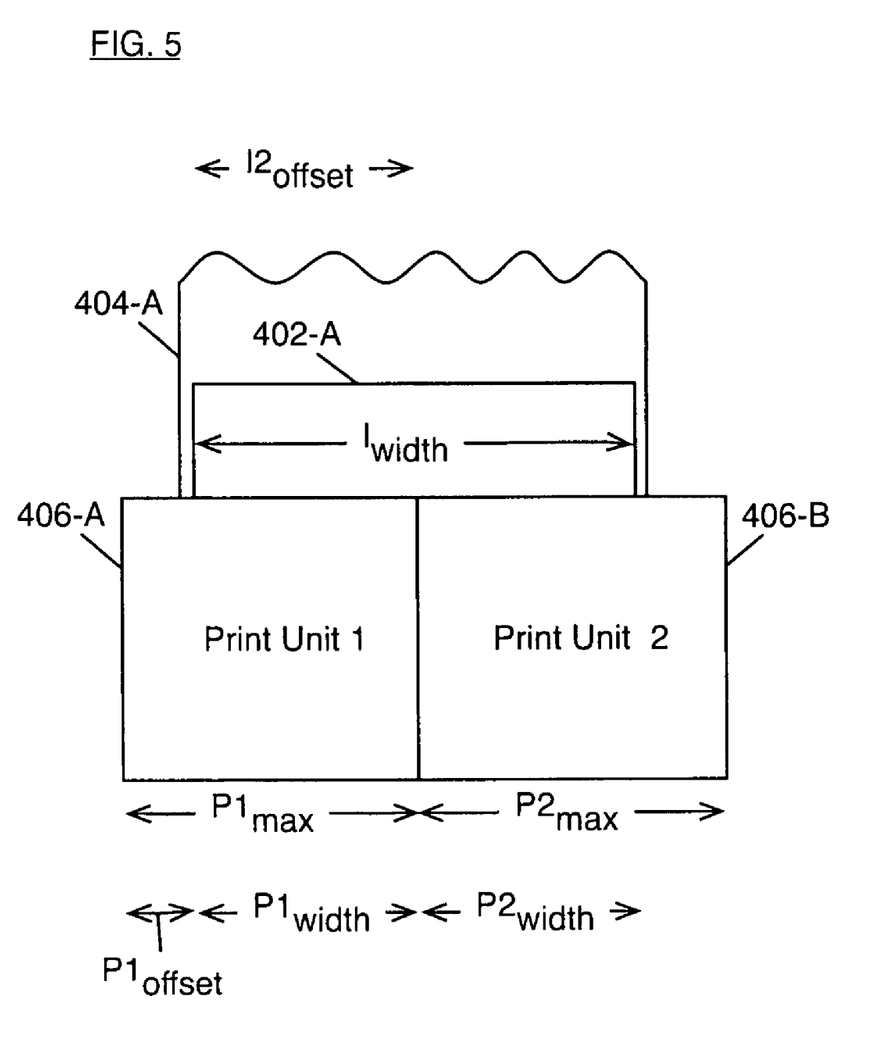
FIG. 5 illustrates parameters used by embodiments of the systems shown in FIGS. 1-3.

FIG. 5 shows how the printing of a page 402-A on a substrate 404-A is accomplished using two print units 406-A and 406-B. In one embodiment, the operator defines the width of the page to be printed ($I_{width}$) and a value ($I_{offset}$) offset into the image representation that represents the first pixel that is to be printed by the print unit. In addition, for each print unit the operator defines the maximum print width of the print unit ($P_{max}$), an offset into the print unit with which the image to be printed is aligned ($P_{offset}$), and the width of the image that the print unit is to print ($P_{width}$). The value $P_{offset}$ defines the position the swath of pixels pixel represented by the value $I_{offset}$ is to be printed. Therefore, in order to print the page 402-A using print units 406-A and 406-B, the operator defines the value $I_{width}$ to indicate the width of the page that is to be printed (which is typically identical to the width of the raster image representation of the page). The operator also defines, for the first print unit 406-A, values $P1_{max}$, $P1_{offset}$, and $P1_{width}$ that correspond to the parameters $P_{max}$, $P_{offset}$, and $P_{width}$, respectively, described above. The value of the $I_{offset}$ with respect to the print unit 406-A is 0 because the print unit 406-A prints the portion of the page 402-A that begins at the left-most pixel of the raster image representation of the page 402-A. The parameter $I_{offset}$ is not shown in FIG. 5 6 because the value thereof is zero.

Similarly, the values $I2_{offset}$, $P2_{max}$ and $P2_{width}$ shown in FIG. 5 correspond to the values of the parameters $I_{offset}$, $P_{max}$, and $P_{width}$, respectively, associated with the print unit 406-B. As should be apparent, the value of $P_{offset}$ for the print unit 406-B is 0 because the portion of the raster image representation that is to be printed thereby is aligned with the left edge of the print unit 406-B. Therefore, the parameter $P_{offset}$ is not shown in FIG. 5. In some embodiments, a graphical user interface is provided to an operator by the composition system to facilitate defining such parameters. In other embodiments, the composition system may calculate some or all of these parameters using page layout information provided by the operator. In still other embodiments, some of these values (e.g., $P1_{max}$) may be predetermined based on characteristics of the printing system that is used. Although, definition of parameters associated with two print units is illustrated in FIG. 5, it should be apparent how parameters for printing systems comprising additional print units may be defined in a similar fashion.

Figure 6:
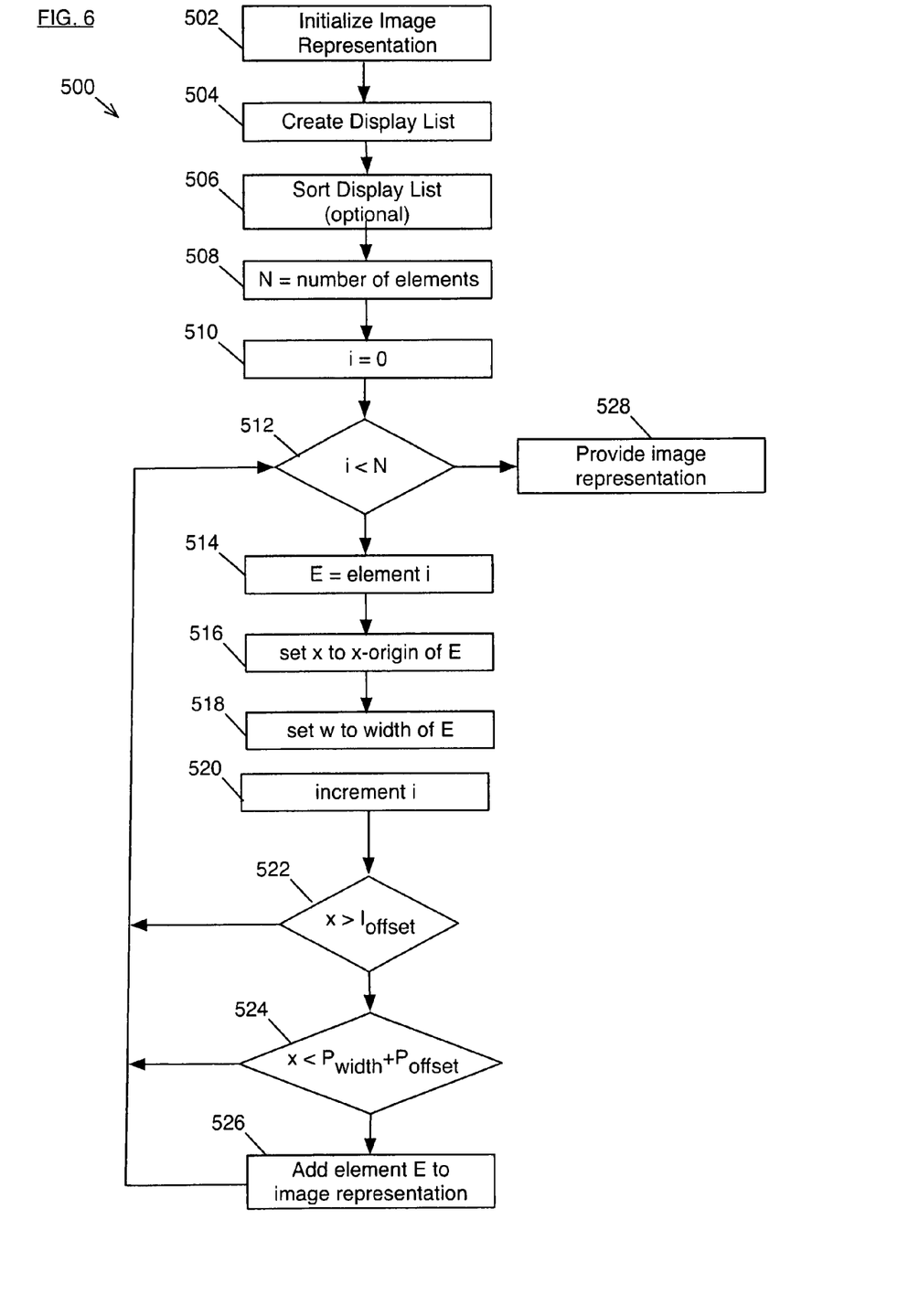
FIG. 6 shows a flowchart of processing undertaken by embodiments of the systems shown in FIGS. 1-3.

FIG. 6 shows a flowchart 500 of how a RIP generates data for a print unit using a PDL representation of a page provided thereto by the composition system. It is assumed that the values of the parameter $I_{width}$ associated with the page represented by the PDL and the values of the parameters $I_{offset}$, $P_{max}$, $P_{offset}$, and $P_{width}$ associated the controller and print unit for which the RIP is to produce a raster image representation have been provided to the RIP. At a block 502, the RIP initializes a raster image representation that has a width of at least $P_{max}$ pixels in accordance with the pixel resolution (i.e., pixels per inch or pixels per centimeter) of the print unit associated with the RIP. A block 504 interprets the PDL representation to create a display list.

The display lists have been used by PDL interpreters and are known in the art. Typically, a display list is an array of elements that are defined by the PDL representation of the page. For example, if the PDL representation uses the PDF format, then the display list may contain an element for each object defined in the PDL that produces marks on a page (e.g., rendering of an image, or text block). In some embodiments, if the PDL representation is in PostScript, then each element of the display list may contain rendering commands corresponding to the PostScript commands that are interpreted between saving and restoring of a graphics state. In other embodiments, an element is created in the display list each time a new path is started.

In some embodiments, the elements of the display list are primitive drawing commands. In other embodiments, the elements are references to bitmaps or image data, typically, created from the PDL.

A block 506 is optional and orders the elements of the display list in accordance with the horizontal position of each element. If the block 506 is not used then processing proceeds from the block 504 to a block 508. The block 508 sets the value of a variable N to the number of elements in the display list and a block 510 sets the value of a variable i to zero. A block 512 determines if the value i is less than the value N and, if so, continues to a block 514. The block 514 sets a variable E to the $i^{th}$ element of the display list (assuming that indexes into arrays are zero based as is common with many programming languages such as C, Objective-C, C++, and Java). A block 516 sets the value of a variable x to the x-origin of the element E with respect to the origin of the page represented by the PDL representation. A block 518 sets the value of a variable w to the width of the element E (or the bounding box of the element E if such element is rotated). A block 520 increments the value of i.

A block 522 determines if the value of x is less than the value of the parameter $I_{offset}$ and if so proceeds to a block 524. The block 524 determines if the value of x is less than the value of the sums of the parameters $P_{width}$ and $P_{offset}$. If the block 524 evaluates to true then the element is within the portion of that page that is to be printed by the print unit associated with the RIP and so processing proceeds to the block 526, which adds a raster image representation of the element E to the raster image representation of the page. If the element E comprises a raster image representation of the element E at the resolution of the raster image representation initialized at the block 502, then the raster image representation of the element E is copied (e.g., using a memory copy or a BitBLT type of operation) into the raster image representation initialized at the block 502. If the resolution of the two raster image representations are not identical, then the raster image representation of the element E is up-sampled or down-sampled so that the resolution thereof is identical to the raster image representation initialized at the block 502. The up/down-sampled version of the raster image representation of the element E is thereafter copied into the raster image representation initialized at the block 502.

If either of the blocks 522 or 524 evaluate to false, processing returns to the block 512. Processing continues in this manner until all of the elements of the display list have been considered and the comparison in block 512 evaluates to a false. Thereafter, processing proceeds to a block 528 that makes the raster image representation of the page available to the controller associated with the RIP. In some embodiments, block 528 sends the raster image representation created by the RIP to the controller. In other embodiments, the block 528 marks the raster image representation created by the RIP as completed and provides the raster image representation to the controller on demand. In still other embodiments, the block 528 provides the raster image representation to the controller as demanded by the controller one raster line at a time. Typically, the RIP uses a double buffering scheme, wherein elements are added to one raster image representation while another, previously completed, raster image representation is being provided to the controller.

Referring once again to FIG. 1, as described above the composition system 108 or the data system 110 provides to the RIP 112-A the PDL representations of the page 102-A and the page 102-B. The RIP 112-A uses the processing illustrated in FIG. 6 to rasterize both PDL representations into one raster image representation that is provided to controller. Such raster image representation comprises all of the elements of the pages 102-A and 102-B that are to be printed by the print unit 106-A. In particular, the display list created at the block 504 of FIG. 6 includes the elements defined by the PDL representations of pages 102-A and 102-B. Thereafter, the blocks 506 through 528 operate using the display list as described above.

In some embodiments of a RIP, the raster image representation of a portion of a page to be printed is generated in a memory thereof (e.g., by the blocks 502-526) and comprises only those page elements that are to be provided to the controller associated with the RIP.

Figure 7A:
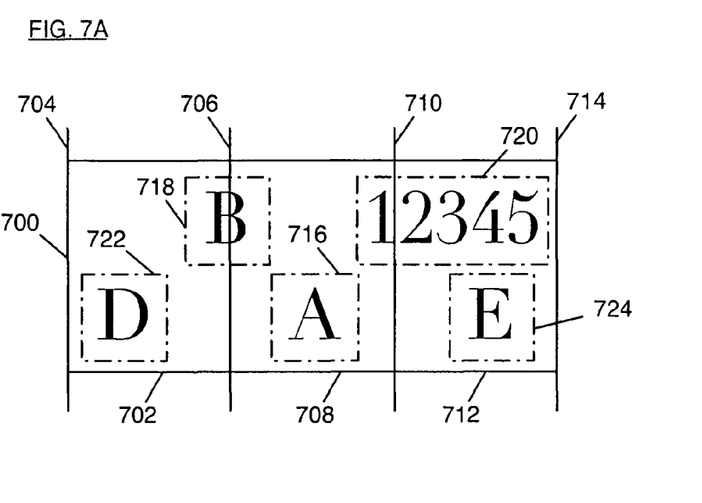
FIG. 7A-7D illustrate how raster image representation of pages that may be created by embodiments of the systems shown in FIGS. 1 and 2.

FIG. 7A shows how a page description language representation of a page 700. The page 700 is printed using three print units, wherein a first print unit prints a portion 702 of the page 700 delimited by lines 704 and 706, a second print unit prints a portion 708 delimited by lines 706 and 710, and a third print unit prints a portion 712 delimited by lines 710 and 714. Note that the lines 704, 706, 710, and 714 are shown for illustration only and do not comprise the pages 702, 708, or 712. The portion 702 comprises an element 722 and a portion of an element 718. The portion 708 of the page 700 comprises an element 716 and portions of the element 718 and an element 720. The portion 712 of the page 700 comprises an element 724 and a portion of the element 720.

As described above, each of the first, second, and third print units that print the page 700 are associated with a RIP. Each RIP receives the page description language representation of the page 700 and generates a raster image representation of the portion of the page that is to be printed by the print unit associated with the RIP. In particular, a RIP associated with the second print unit generates and provides to a controller associated with the second print unit a raster image representation of the portion 708 of the page 700. The raster image representation includes at least the element 716 and a portion of the element 718 and a portion of the element 720.

Each RIP comprises a page buffer (i.e., memory) into which the raster image representation generated thereby is stored and the memory is read and provided to the controller associated with the print unit. The raster representation of each element that comprises (either wholly or a partially) the raster image representation is stored in the page buffer at a memory location that corresponds to the location where the element is to appear in the raster image representation.

In some embodiments, the RIP comprises a page buffer that is larger that the portion of the page is to be printed by the print unit that is associated with the RIP. The boundaries of the page buffer delimit a rasterization region of the page buffer. The portion of the page buffer that is sent to the controller associated with the print unit and printed thereby represents a printable region of the page buffer. In such embodiments, the RIP compares the boundary of each element that is represented in the page description language and if any portion of the element is within the printable region, a raster representation of the element is added to the page buffer. Furthermore, any elements that have boundaries that are within the boundaries of the rasterizable region are also added to the page buffer. Only those elements that are partially in the printable region and whose boundaries extend beyond a boundary of the rasterizable region are clipped. Such elements are clipped to the boundaries of the rasterizable region. After all such elements are processed in this manner, the portion of the page buffer that comprises the printable region is provided to the controller associated with the print unit.

Figure 7B:
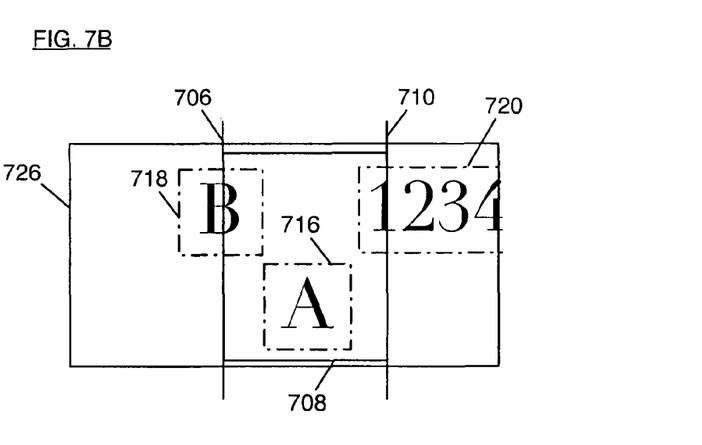

FIG. 7B illustrates how the portion 708 of the page 700 shown in FIG. 7A is rasterized by an embodiment of the RIP described in the foregoing. In particular, the RIP comprises a page buffer that has a rasterizable region 726. The memory of the RIP used for the page buffer is at least sufficient to hold the rasterizable region but may be larger. The lines 706 and 710 and the top and bottom boundaries of the page defined by page description language delimit the portion 708 of the page 700 that is to be printed (and also the printable region). As shown in FIG. 7B, the top and bottom boundaries of the rasterization region 726 may extend beyond the top and bottom boundaries of the printable region 710. The element 716 is added to the page buffer because such element is completely within the printable region 708 and the rasterization region 726. The elements 718 and 720 are added to the page buffer because at least a portion of each such element is within the printable region 710. The elements 718 is added in the entirety thereof to the page buffer because the boundary of the element 718 does not extend beyond the boundary of rasterizable region 726; however, only a portion of the element 720 is added to the page buffer because the boundary thereof extends beyond the boundary of the rasterizable region. In particular, the boundary of the element 720 is clipped in accordance with the boundary of the rasterizable region 726. The elements 722 and 724 of the page 700 are not added to the page buffer because such elements are outside of the printable region 710.

Figure 7C:
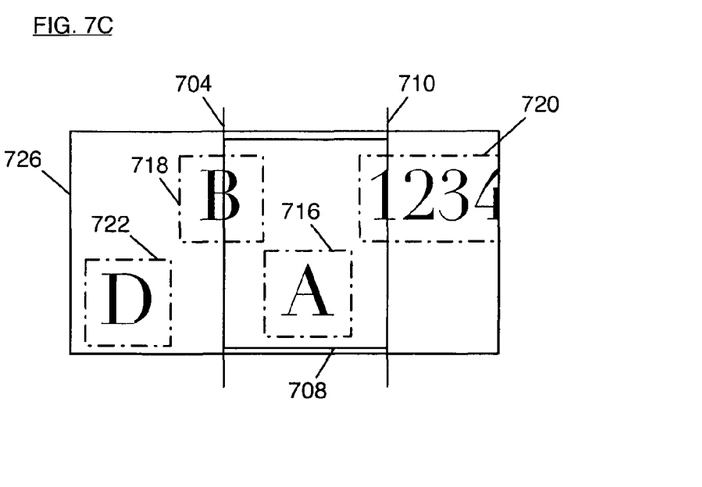

FIG. 7C illustrates how the page 700 shown in FIG. 7A is rasterized by another embodiment of a RIP described above. As with the embodiment shown in FIG. 7B, the RIP comprises a page buffer having the rasterizable region 726 and the printable region 708. The embodiment of the RIP shown in FIG. 7C adds all elements of the page 700 that are within the rasterizable region including those that are outside of the printable region. The elements 716 and 718 and a portion of the element 720 are added to the page buffer for reasons identical to those described above in connection with FIG. 7B. Furthermore, the entire element 722 is added to the page buffer because the element 722 is wholly within the rasterization region. The element 724 is not added to the page buffer because no portion of the element 724 is in the printable region 710 and because a portion of the element 724 is outside the rasterization region.

Generally, throughput of the RIP should improve as the number of comparison operation performed to determine whether to add an element to the page buffer is reduced or the number of elements that are clipped is reduced.

Figure 7D:
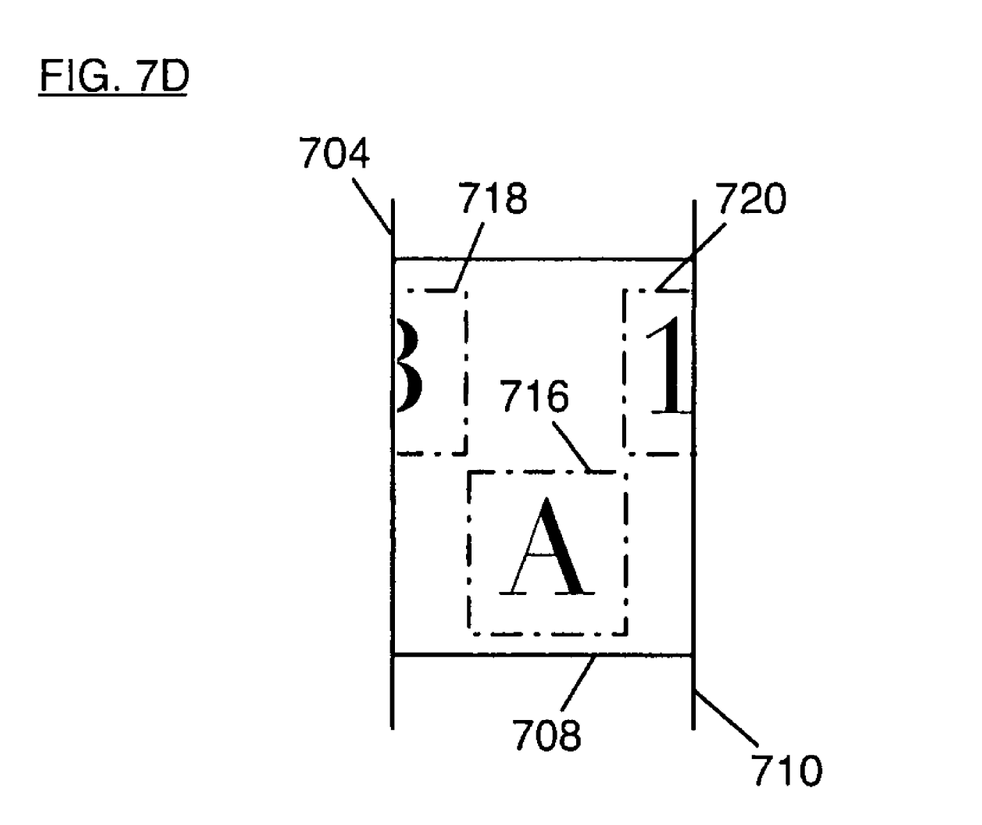

FIG. 7D illustrates the raster image representation of the portion 710 of the page 700 that is generated from the printable portions shown in FIGS. 7B and 7C. Typically, only those bytes of the rasterizable region 726 that comprise the printable region 710 are selected to comprise the raster image representation. Typically, the RIP iteratively selects contiguous bytes of the rasterizable portion (or the page buffer) that correspond to each row of the raster image representation.

In some embodiments the RIP is implemented as software executed in a computer and software may be written using Java, C, C++, or other common programming languages. In other embodiments, the RIP is implemented as a combination of software and hardware components. It should be apparent that portions of the RIP (e.g., those requiring high throughput) may be implemented using field programmable gate arrays (FPGAs) or application specific integrated circuits (ASICs).

It should be apparent that the above-described printing system may comprise any number of print units to print on sheets or webs of paper of any width. In particular, the width of the paper is limited by the ability to transport the paper and not by any limitations related to the number of printing units that may be used in the printing system. It should also be apparent, that any number of pages may be simultaneously printed by a particular print unit of a printing system, wherein a page is defined by a PDL representation. Specifically, the number of such pages may only be limited by the resolution of the print unit.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A system for printing a page on a substrate, wherein the page is designated by a page description language representation, wherein the system comprises:
    a first print unit for printing a color on a first portion of the substrate;
    a second print unit for printing the color on a second portion of the substrate wherein the first and second portions of the substrate do not substantially overlap;
    a first RIP that determines a first portion of the page description language representation to rasterize and rasterizes the first portion of the page description language representation to generate a first raster image representation, wherein the first raster image representation is used by the first print unit to print a first portion of the page on the first portion of the substrate; and
    a second RIP that determines a second portion of the page description language representation different than the first portion of the page description language representation and rasterizes the second portion of the page description language representation to generate a second raster image representation, wherein the second raster image representation is used by the second print unit to print a second portion of the page on the second portion of the substrate.

2. The system of claim 1 further comprising a controller, wherein the controller controls the first print unit in accordance with the first raster image representation.

3. The system of claim 2, wherein the first print unit comprises an inkjet head and the controller controls ejection of ink from the nozzles of the inkjet head.

4. The system of claim 3, wherein the first print unit uses electrophotography.

5. The system of claim 1, wherein the first print unit prints a portion of a further page adjacent to the first portion of the page, wherein the second page is designated by a further page description language representation.

6. The system of claim 5, wherein the first RIP rasterizes the page description language representation and the further page description language representation to generate the first raster image representation.

7. The system of claim 6, wherein the first RIP develops a display list that comprises elements designated in the page description language representation and the further page description language representation.

8. The system of claim 1, wherein the first RIP includes a page buffer that is larger than the first raster image representation.

9. The system of claim 8, wherein a raster representation of an element designated in the page description language representation is stored in the page buffer, wherein a portion of the stored raster representation of the element is not used by the first print unit.

10. The system of claim 1, wherein a portion of the RIP is implemented using an FPGA or an ASIC.

11. A method for printing a page on a substrate, wherein the page is designated by a page description language representation, wherein the method comprises the steps of:
    determining and rasterizing a first portion and a second portion of the page description language representation to generate a first and a second raster image representation, respectively, wherein the first and second portions are determined by first and second raster image processors, respectively, and the first and second raster image representations are generated by first and second raster image processors, respectively;
    controlling a first print unit to print a color in accordance with the first raster image representation to print thereby the first portion of the page on a first portion of the substrate, wherein the first portion of the page is less than the entirety thereof;
    controlling a second print unit to print the color in accordance with the second raster image representation to print thereby the second portion of the first page on a second portion of the substrate; and
    wherein the first portion of the page description language representation is different than the second portion of the page description language representation and the first and second portions of the substrate do not substantially overlap.

12. The method of claim 11, wherein the step of controlling the first print unit comprises the further step of controlling the first print unit to print a portion of a second page, wherein the second page is designated by a second page description language representation and wherein the portion of the second page is printed adjacent to the first portion of the first named page.

13. The method of claim 11, wherein the method comprises the step of merging a template with data from a database to develop the page description language.

14. The method of claim 11, wherein the step of controlling the first print unit comprises the further step of controlling ink jet head in accordance with the raster image representation.

15. The method of claim 11, wherein the step of rasterizing the page description language representation comprises the step of creating a display list.

16. The method of claim 11, wherein the first and the second raster image representations are identical.

17. The method of claim 11, wherein the step of rasterizing the first portion of the page description language includes the step of rasterizing an element designated in the first page description language representation.

18. The method of claim 17, wherein the raster image processor includes a page buffer and the method comprises the step of adding a raster image representation of the element to the page buffer.

19. The method of claim 18, wherein the step of adding the raster image representation of the element to the page buffer comprises the step of adding a portion of the raster image representation of the element that is not printed by the first print unit.

20. The system of claim 1, wherein the first portion and the second portion of the page description language are not identical.

* * * * *